United States Patent
Tesner et al.

(10) Patent No.: US 8,454,719 B2
(45) Date of Patent: Jun. 4, 2013

(54) TRANSMISSION BREATHER ASSEMBLY

(75) Inventors: Kenneth C. Tesner, Macomb, MI (US); Hoang L. Vo, Madison Heights, MI (US); Dale Cattell, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 350 days.

(21) Appl. No.: 12/860,014

(22) Filed: Aug. 20, 2010

(65) Prior Publication Data
US 2011/0173935 A1   Jul. 21, 2011

Related U.S. Application Data

(60) Provisional application No. 61/295,526, filed on Jan. 15, 2010.

(51) Int. Cl.
   *B01D 59/50*   (2006.01)
   *B01D 50/00*   (2006.01)

(52) U.S. Cl.
   USPC ............................ 55/385.3; 55/385.4; 55/507

(58) Field of Classification Search
   USPC ................. 55/385.3, 385.4, 507; 220/366, 44
   See application file for complete search history.

(56) References Cited

U.S. PATENT DOCUMENTS

| | | | | |
|---|---|---|---|---|
| 2,675,093 A | * | 4/1954 | McCall et al. | 96/139 |
| 3,475,885 A | * | 11/1969 | Kline | 96/147 |
| 3,622,031 A | * | 11/1971 | Butler et al. | 220/371 |
| 3,884,134 A | * | 5/1975 | Jordan | 454/10 |
| 4,147,096 A | * | 4/1979 | Caswell | 454/20 |
| 4,392,584 A | * | 7/1983 | Bauer | 220/374 |
| 4,461,066 A | * | 7/1984 | Peterson | 29/455.1 |
| 5,024,345 A | * | 6/1991 | Deweerdt | 220/366.1 |
| 5,125,428 A | * | 6/1992 | Rauter | 137/199 |
| 5,464,469 A | * | 11/1995 | Close et al. | 96/220 |
| 5,914,415 A | * | 6/1999 | Tago | 55/385.4 |
| 6,015,444 A | * | 1/2000 | Craft et al. | 55/320 |
| 6,217,639 B1 | * | 4/2001 | Jackson | 96/134 |
| 6,447,565 B1 | * | 9/2002 | Raszkowski et al. | 55/385.4 |
| 6,513,550 B1 | * | 2/2003 | Kwilosz | 138/96 R |
| 6,745,565 B1 | * | 6/2004 | Wahner et al. | 60/487 |
| 7,044,150 B2 | * | 5/2006 | Seidl | 137/15.19 |
| 7,152,589 B2 | * | 12/2006 | Ekeroth et al. | 123/572 |
| 7,484,533 B1 | * | 2/2009 | Arndt | 138/96 R |
| 7,597,114 B2 | * | 10/2009 | Buckingham et al. | 137/433 |
| 7,959,026 B2 | * | 6/2011 | Bertani | 220/373 |
| 8,016,904 B2 | * | 9/2011 | Gwin et al. | 55/385.4 |
| D646,362 S | * | 10/2011 | Olateru et al. | D23/260 |
| 2006/0081229 A1 | * | 4/2006 | Gronberg et al. | 123/573 |
| 2007/0170186 A1 | * | 7/2007 | Bertani | 220/303 |
| 2008/0156374 A1 | * | 7/2008 | Nakano et al. | 137/14 |

* cited by examiner

*Primary Examiner* — Amber Orlando

(57) ABSTRACT

A transmission breather assembly includes a vertically disposed stanchion or stem having a castellated end and an annular shoulder axially spaced therefrom. The stanchion defines an internal passageway which communicates with the interior of the transmission either directly or through a flexible tube. The stanchion may be secured to a surface such as the vehicle firewall or may be mounted directly to the transmission housing if space and packaging requirements permit. Disposed on and over the castellated, open end of the stanchion is a cap or cover. The cap or cover includes an internal cylindrical wall that cooperates with the castellated end of the stanchion to retain it thereon and creates an annular space adjacent the stanchion which functions as an air passageway. The lower open end of the cap or cover is generally radially aligned with the annular shoulder on the stanchion. The cap or cover is fabricated of a hydrophobic material.

20 Claims, 3 Drawing Sheets

TRANSMISSION BREATHER ASSEMBLY

CROSS REFERENCE TO RELATED APPLICATION

This application claims the benefit of U.S. Provisional Patent Application Ser. No. 61/295,526, filed Jan. 15, 2010, which is hereby incorporated in its entirety herein by reference.

FIELD

The present disclosure relates to devices for venting automatic transmissions and more specifically to a transmission breather assembly especially configured to reduce and eliminate to the greatest extent possible the ingestion of water into a transmission.

BACKGROUND

The statements in this section merely provide background information related to the present disclosure and may or may not constitute prior art.

Transmissions, particularly hydraulically controlled planetary gear automatic transmissions for motor vehicles, operate at temperatures well above ambient, often at 130° C. (265° F.) or higher. Because they may begin operation at ambient temperature as low as −35° C. (−30° F.) or lower, the air within the transmission will undergo significant expansion. Conversely, when they become inactive, their nominal temperature may drop relatively rapidly and the air within the transmission will contract. In order to accommodate these changes and to avoid pressurization or a partial vacuum within the transmission, they are equipped with a breather system which allows exhaust and ingestion of air.

When the transmission temperature is rising and air is being driven out of the transmission through the breather system, the only likely operational difficulty is the blocking or plugging of the breather system which would result in pressurization of the transmission. Conversely, a temperature drop is accompanied by ingestion of air through the breather system. This can have adverse consequences if water becomes entrained with the entering air. While this might appear to be an uncommon occurrence, a sudden temperature drop may be caused by the immersion of the transmission in water as a vehicle operator attempts to navigate a flooded roadway or stream. At the same time, a large quantity of water may come in contact with or essentially surround the breather system inlet/outlet and be drawn in with the ingested air, resulting in water in the transmission.

This is highly undesirable and the present invention is directed to reducing or eliminating the ingestion of water into a transmission through the breather system.

SUMMARY

The present invention provides a transmission breather assembly having greatly improved water rejection capability relative to the prior art. The transmission breather assembly includes a vertically disposed stanchion or stem having a castellated end and an annular shoulder axially spaced therefrom. The stanchion defines an internal passageway which communicates with the interior of the transmission either directly or through a flexible tube. The stanchion may be secured to a surface such as the vehicle firewall or may be mounted directly to the transmission housing if space and packaging requirements permit. Disposed on and over the castellated, open end of the stanchion is a cap or cover. The cap or cover includes an internal cylindrical wall that cooperates with the castellated end of the stanchion to retain it thereon and creates an annular space adjacent the stanchion which functions as an air passageway. The lower open end of the cap or cover is generally radially aligned with the annular shoulder on the stanchion. The cap or cover is fabricated of a hydrophobic material. When subjected to a significant downflow of water on the cap or cover, the transmission breather assembly of the present invention exhibits greatly reduced water ingestion during air inflow. The transmission breather assembly of the present invention finds application in manual transmissions, automatic transmissions and transfer cases.

Thus it is an aspect of the present invention to provide a transmission breather assembly for a manual motor vehicle transmission.

It is a further aspect of the present invention to provide a transmission breather assembly for an automatic motor vehicle transmission.

It is a still further aspect of the present invention to provide a transmission breather assembly for a motor vehicle transfer case.

It is a still further aspect of the present invention to provide a transmission breather assembly especially configured to reduce ingestion of water as air is being drawn into a transmission.

It is a still further aspect of the present invention to provide a transmission breather assembly including a vertically oriented hollow stanchion having a castellated open end.

It is a still further aspect of the present invention to provide a transmission breather assembly including a cap or cover that is retained on a vertical stanchion.

It is a still further aspect of the present invention to provide a transmission breather assembly including a cap or cover that is fabricated of a hydrophobic material.

It is a still further aspect of the present invention to provide a transmission breather assembly which exhibits greatly improved water rejection during air inflow.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
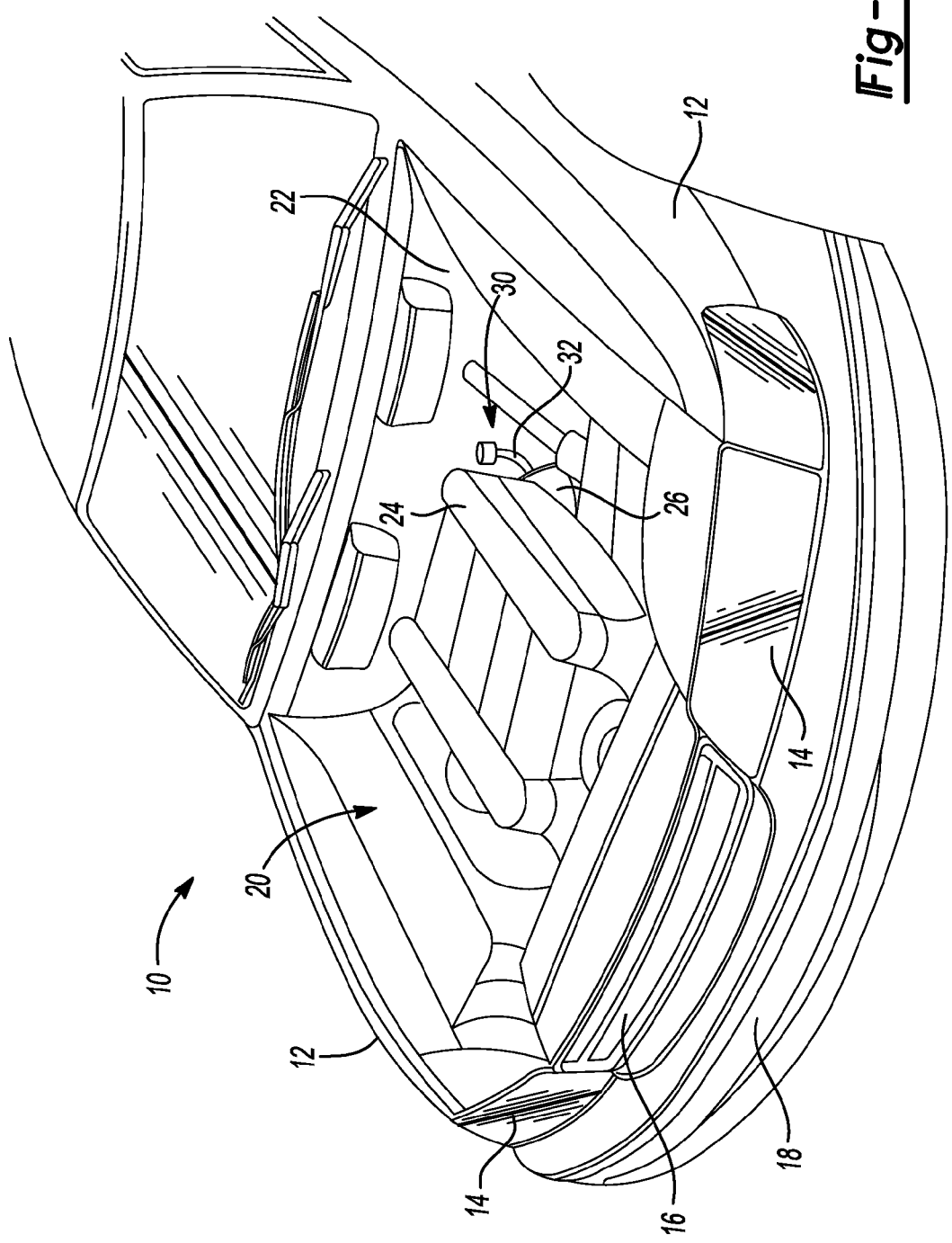
FIG. 1 is a perspective view of a front portion of a motor vehicle incorporating a transmission breather assembly according to the present invention.
Figure 2:
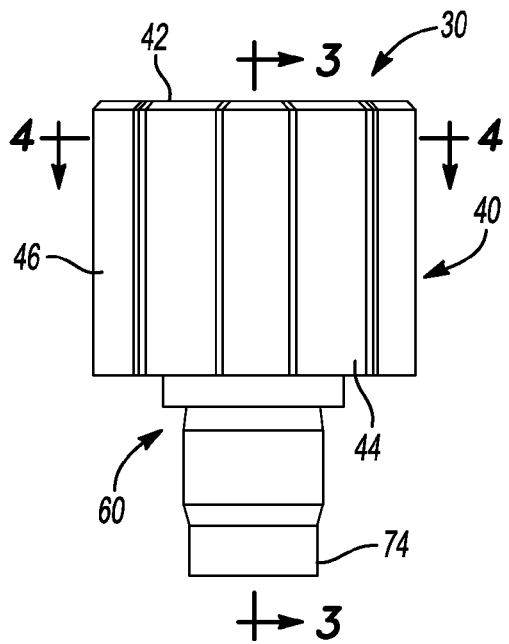
FIG. 2 is a side elevational view of a transmission breather assembly according to the present invention.

With reference to FIG. 1, a front portion of a motor vehicle such as a passenger car with the hood removed is illustrated and generally designated by the reference number 10. The passenger car 10 typically includes front fenders 12, a front fascia including headlights 14, a grille 16 and a front bumper 18. Within an engine compartment 20 which is defined and limited by a firewall 22 is disposed a prime mover 24 such as a gasoline, hybrid, Diesel or flex fuel engine. Mechanically coupled to and driven by the output of the prime mover 24 is a transmission 26 having an output which drives a final drive assembly (not illustrated). In fluid communication with the interior of the transmission 26 is a transmission breather assembly 30. The transmission breather assembly 30 may be secured to the firewall 22 or other convenient structure and connected to the transmission 26 through flexible tubing or a hose 32. Alternatively, it may be mounted directly to the transmission 26 if space and packaging requirements and limitations permit.

Figure 3:
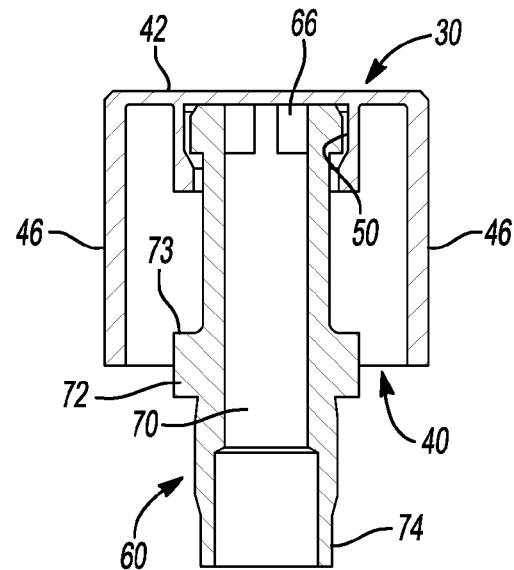
FIG. 3 is a full, sectional view of a transmission breather assembly according to the present invention taken along line 3-3 of FIG. 2.
Figure 4:
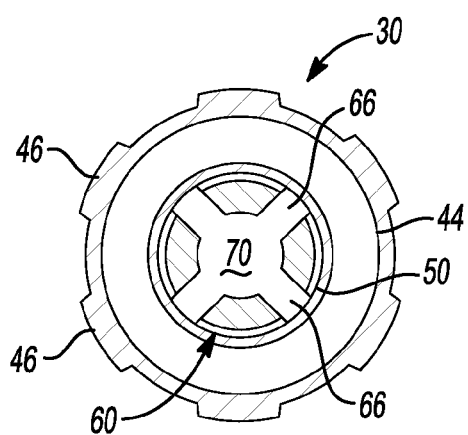
FIG. 4 is a full, sectional view of a transmission breather assembly according to the present invention taken along line 4-4 of FIG. 2.
Figure 5:
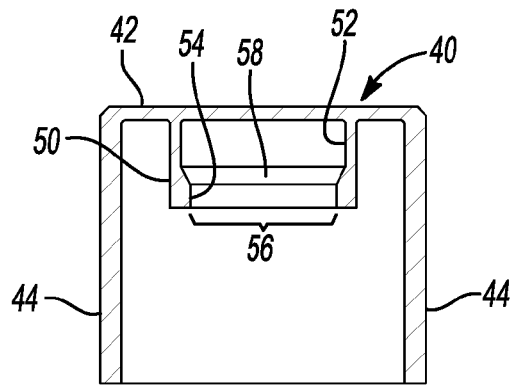
FIG. 5 is full, sectional view of a cap or cover of a transmission breather assembly according to the present invention.
Figure 6:
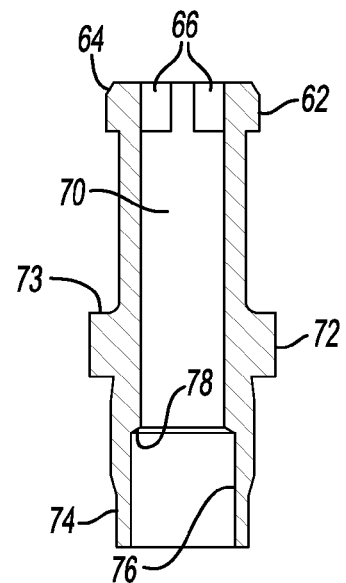
FIG. 6 is full, sectional view of a stanchion or stem of a transmission breather assembly according to the present invention.

Referring now to FIGS. 2, 3, 4 and 5, the transmission breather assembly 30 includes a cap or cover 40 and a stem or stanchion 60. The cap or cover 40 includes a flat, circular end portion 42 merging with a cylindrical sidewall 44 having a plurality of circumferentially spaced-apart thicker, axially extending ribs 46. There may be between four and eight ribs 46 (or more of fewer) alternating with reduced thickness regions of the sidewall 44 of approximately equal width. Preferably, as best illustrated in FIG. 4, there are six ribs 46.

Concentrically disposed within the cylindrical sidewall 42 is a short cylindrical wall or annulus 50. A cylindrical inner surface 52 of the short wall or annulus 50 includes a shoulder 54 that defines an opening 56 having a diameter smaller than the diameter of the inner surface 52. A chamfered or oblique surface 58 joins the shoulder 54 and the inner surface 52. The shoulder 54 functions as a retaining structure for the stem or stanchion 60 as will be more fully described below.

The cap or cover 40 is preferably fabricated of a hydrophobic, i.e., low wettability, material. Such materials both tend to shed water and have low water absorbtion. Depending upon the mounting location, the hydrophobic material typically must have a melting temperature of at least 125° C. but may be in excess of 200° C. (390° F.). Several materials have been found suitable, their choice being governed by other variables such as cost, malleability and stability in the service environment. Acetron GP (a nylon formulation), polyphenylene sulfide, derivatives of polypropylene and thermoplastic polyester elastomers such as Hytrel have all been found suitable. Hytrel is a registered trademark of E. I. du Pont de Nemours & Company.

Referring now to FIGS. 2, 3, 4 and 6, the stem or stanchion 60 includes an enlarged castellated annular end portion 62 having a chamfered or oblique terminal surface 64. The oblique terminal surface 64 facilitates assembly of the stem or stanchion 60 with the cap or cover 40 just as the chamfered or oblique surface 58 of the cylindrical wall or annulus 50 facilitates disassembly. As best illustrated in FIG. 4, the enlarged castellated annular end portion 62 includes a plurality of radially extending slots or channels 66 which extend between the outer surface of the annular end portion 62 and a cylindrical concentric internal passageway 70. While four of the slots or channels 66 have been found preferable, more or fewer of them may be utilized.

With reference specifically to FIG. 3, the stem or stanchion 60 also includes a shoulder or annulus 72 extending outwardly from its outer surface. The axial length of the shoulder or annulus 72 is preferably bi-sected by the lower edge of the cap or cover 40. That is, preferably about one half the axial length of the shoulder or annulus 72 is within the cap or cover 40 and about one half is below or outside it. At the upper end of the shoulder or annulus 72 is a fillet or radiused surface 73 which merges with the sidewall of the stem or stanchion 60. The end of the stem or stanchion 60 opposite the enlarged end portion 62 defines a reduced outside diameter portion 74 which facilitates attachment of tubing or a hose, such as the hose 32 illustrated in FIG. 1. Similarly, the internal passageway 70 at this end defines an enlarged diameter portion 76 and an intermediate oblique shoulder 78. The enlarged diameter portion 76 facilitates installation of the transmission breather assembly 40 and specifically the stem or stanchion 60 directly on a fitting or stub (both not illustrated) of a transmission such as the transmission 26 illustrated in FIG. 1. The oblique shoulder 78 limits travel on such a fitting or stub as will be readily appreciated.

The function of the transmission breather assembly 30 will now be described with reference to FIGS. 1, 3, 4 and particularly to FIG. 7. As noted above, a typical operating temperature of an automatic transmission may be 130° C. (265° F.) and cooling to just 90° C. (195° F.) can create a partial vacuum within the transmission which draws air through the vent system at a rate of as much as 12.5 liters/min. for a short period of time. With a typically sized breather cap, this can result in a flow rate as high as 2 meters/sec. This rapid ingestion of air can carry water with it if there is water or water spray in the area of the vent cap resulting from, for example, vehicle operation in deep water.

Figure 7:
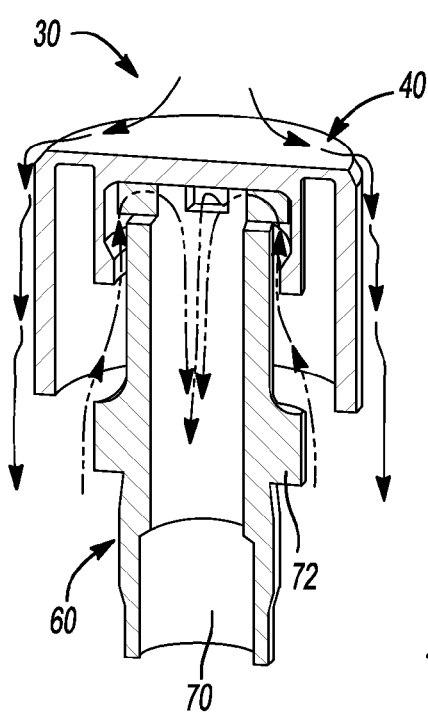
FIG. 7 is a perspective view with portions broken away of a transmission breather assembly according to the present invention schematically illustrating its function.

As FIG. 7 clarifies, there is, first of all, the hydrophobic effect of the material from which the cap or cover 40 is fabricated. Water is shed from the cap or cover 40 and tends to flow down and away from it rather than being drawn to the cap or cover 40 and turned under the lip and toward the stem or stanchion 60 by the Coanda effect, as indicated by the outer, downwardly directed arrows. The plurality of ribs 46 also direct and guide the water vertically, thereby minimizing angular or oblique water movement and further assisting shedding of the water at the lower edge of the cap or cover 40.

The relatively large circular opening between the lower edge of the cap or cover 40 and the stem or stanchion 60 has a negligible effect on the air velocity and air flow which is indicated by the upwardly directed arrows. Accordingly, there is essentially no pressure drop in this area which, in turn, limits air flow energy available to draw water into the cap or cover 40 and further reduces the likelihood of water ingestion. The shoulder or annulus 72 also cooperates in this regard to minimize or eliminate upward travel of water into the cap or cover 40 and the radiused surface 73 both sheds water and eliminates a circular region where water may collect. As illustrated in FIGS. 3 and 7, the annular gap between the shoulder 54 of the short cylindrical well 50 and the adjacent region of the stem or stanchion 60 provides a relatively small opening which not only minimizes the likelihood of water ingestion but also the inhalation of foreign matter such as dust and particulates. Air then passes through the slots or channels 66, into the internal passageway 70 and into the transmission 26, as indicated by the inner, downwardly directed arrows.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission breather assembly comprising, in combination,
   a cap having a closed circular end, an annular sidewall extending from said circular end, a plurality of ribs extending axially along an outside surface of said sidewall and a concentric cylindrical member extending from an inside surface of said closed circular end, and
   a stanchion defining a cylindrical, hollow body having a first enlarged diameter region at one end adapted to engage said cylindrical member of said cap, said first enlarged diameter region having a plurality of radial passageways and a second enlarged diameter region axially spaced from said first enlarged diameter region.

2. The transmission breather assembly of claim 1 wherein said sidewall includes an edge opposite said circular end, whereby said edge is substantially axially aligned with an axial midpoint of said second enlarged diameter region when said cap and stanchion are assembled.

3. The transmission breather assembly of claim 1 further including a radiused surface between one end of said second enlarged region and said cylindrical hollow body of said stanchion.

4. The transmission breather assembly of claim 1 wherein said cylindrical hollow body of said stanchion includes a region of reduced diameter at an end opposite said one end.

5. The transmission breather assembly of claim 1 wherein said cylindrical hollow body of said stanchion includes a region of increased inside diameter at an end opposite said one end.

6. The transmission breather assembly of claim 1 further including a shoulder defining a region of reduced diameter on an end of said concentric cylindrical member opposite said circular end.

7. The transmission breather assembly of claim 1 wherein said cap is fabricated of a hydrophobic material.

8. A transmission breather assembly comprising, in combination,
   an elongate hollow cylindrical member having a first enlarged diameter annular region defining a plurality of radial passageways at one end and a second enlarged diameter annular region axially spaced from said first annular region; and
   a cover having a solid end and a cylindrical sidewall extending from said end and terminating in a circular edge, a plurality of axial ribs extending along an outside surface of said sidewall and a concentric annulus disposed on an inner surface of said solid end of said cover and having a shoulder on an inner surface adapted to retain said first enlarged diameter annular region of said elongate hollow cylindrical member in said concentric annulus.

9. The transmission breather assembly of claim 8 wherein said circular edge of said cover is substantially axially aligned with an axial midpoint of said second enlarged diameter annular region when said cover is installed on said first enlarged diameter annular region of said elongate hollow cylindrical member.

10. The transmission breather assembly of claim 8 wherein said cover is fabricated of a hydrophobic material.

11. The transmission breather assembly of claim 8 further including a radiused surface between one end of said second enlarged diameter annular region and said elongate hollow cylindrical member.

12. The transmission breather assembly of claim 8 wherein said elongate hollow cylindrical member includes a region of reduced diameter at an end opposite said one end.

13. The transmission breather assembly of claim 8 wherein said elongate hollow cylindrical member includes a region of increased inside diameter at an end opposite said one end.

14. The transmission breather assembly of claim 8 wherein said axial ribs have a circumferential width substantially equal to a circumferential width of a space between an adjacent two of said axial ribs.

15. A breather assembly for use with a motor vehicle transmission, comprising, in combination,
   a cap having a solid end panel and a cylindrical skirt extending therefrom, said skirt including an edge spaced from said end panel, a plurality of axially extending ribs on an outside surface of said skirt and a concentric cylindrical member extending from an inside surface of said end panel, and
   a cylindrical stanchion defining a hollow interior and having a first enlarged diameter portion at one end and a plurality of radial slots in said first enlarged diameter portion communicating with said hollow interior and a second enlarged diameter portion axially spaced from said first enlarged diameter portion, whereby said second enlarged diameter portion of said cylindrical stanchion axially aligns with said edge of said skirt when said cap is assembled to said cylindrical stanchion.

16. The transmission breather assembly of claim 15 further including a radiused surface between one end of said second enlarged diameter portion and said cylindrical stanchion.

17. The transmission breather assembly of claim 15 wherein said cylindrical stanchion includes a region of reduced outside diameter at an end opposite said first enlarged diameter portion.

18. The transmission breather assembly of claim 15 wherein said cylindrical stanchion includes a region of increased inside diameter at an end opposite said first enlarged diameter portion.

19. The transmission breather assembly of claim 15 further including a shoulder defining a region of reduced diameter on an end of said concentric cylindrical member opposite said solid end panel.

20. The transmission breather assembly of claim 15 wherein said cap is fabricated of a hydrophobic material.

* * * * *